June 16, 1942.  H. W. ROGERS  2,286,649
FRUIT PEELING MACHINE
Filed Oct. 24, 1941    7 Sheets-Sheet 1
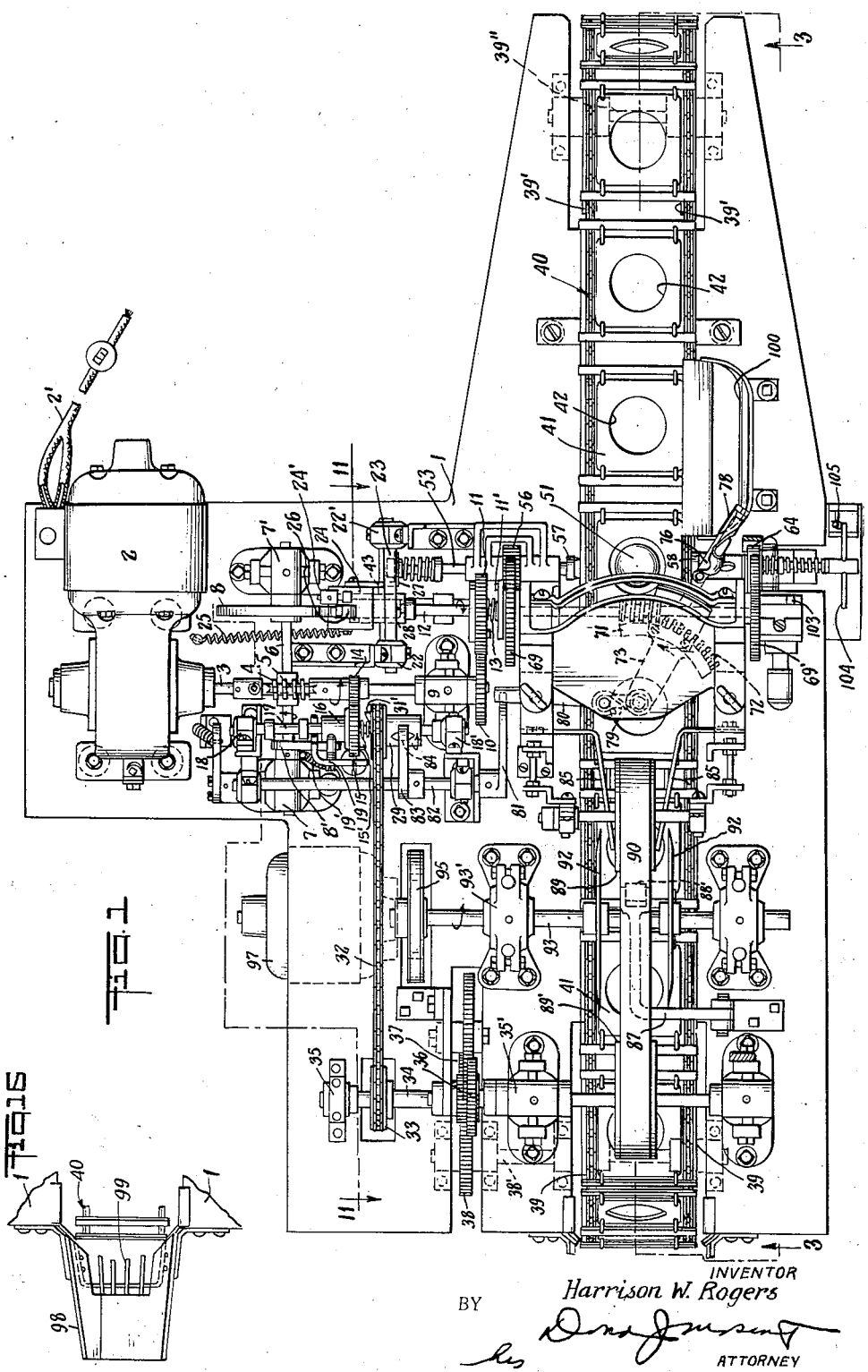
INVENTOR
Harrison W. Rogers
BY
ATTORNEY

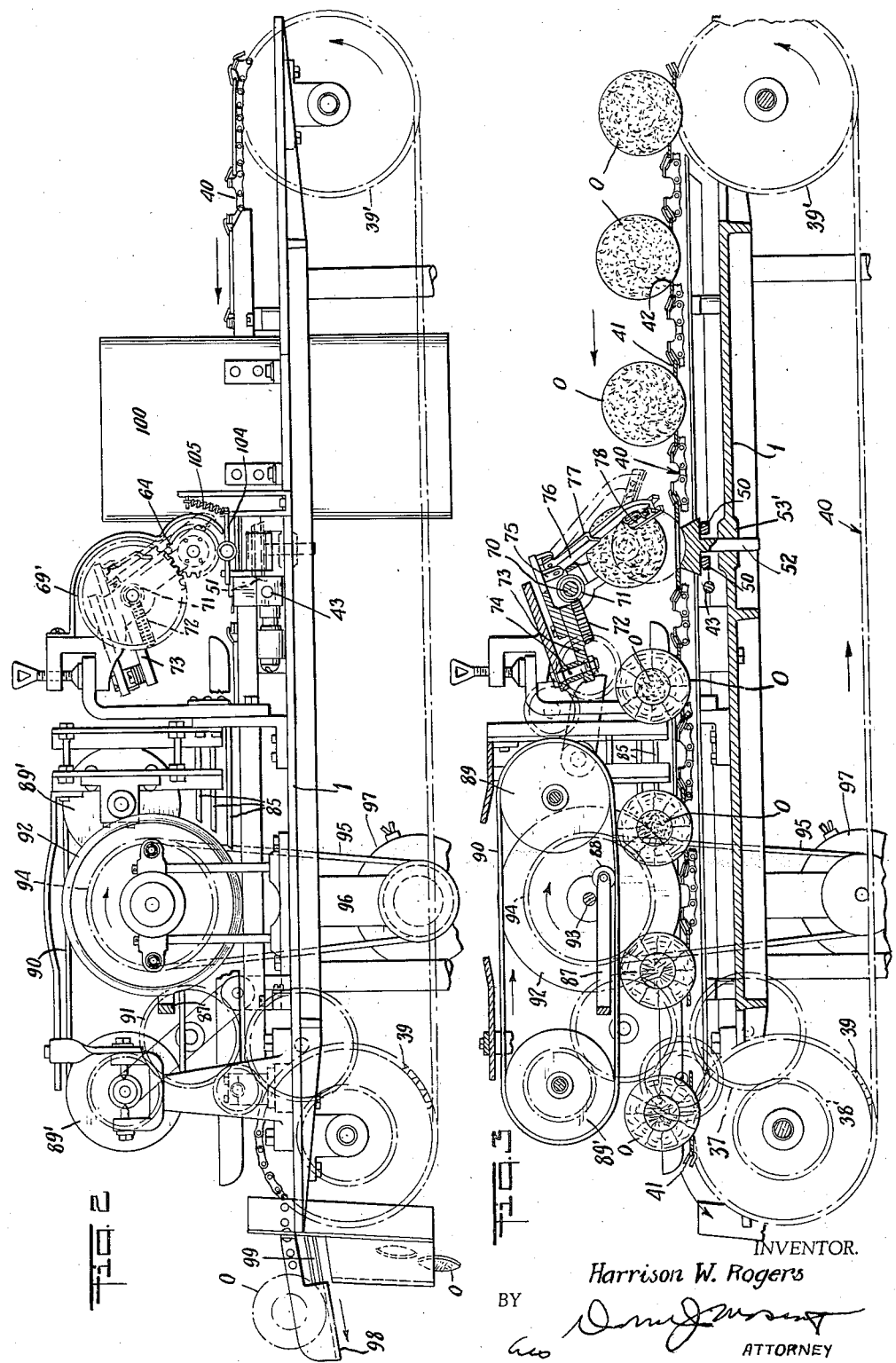

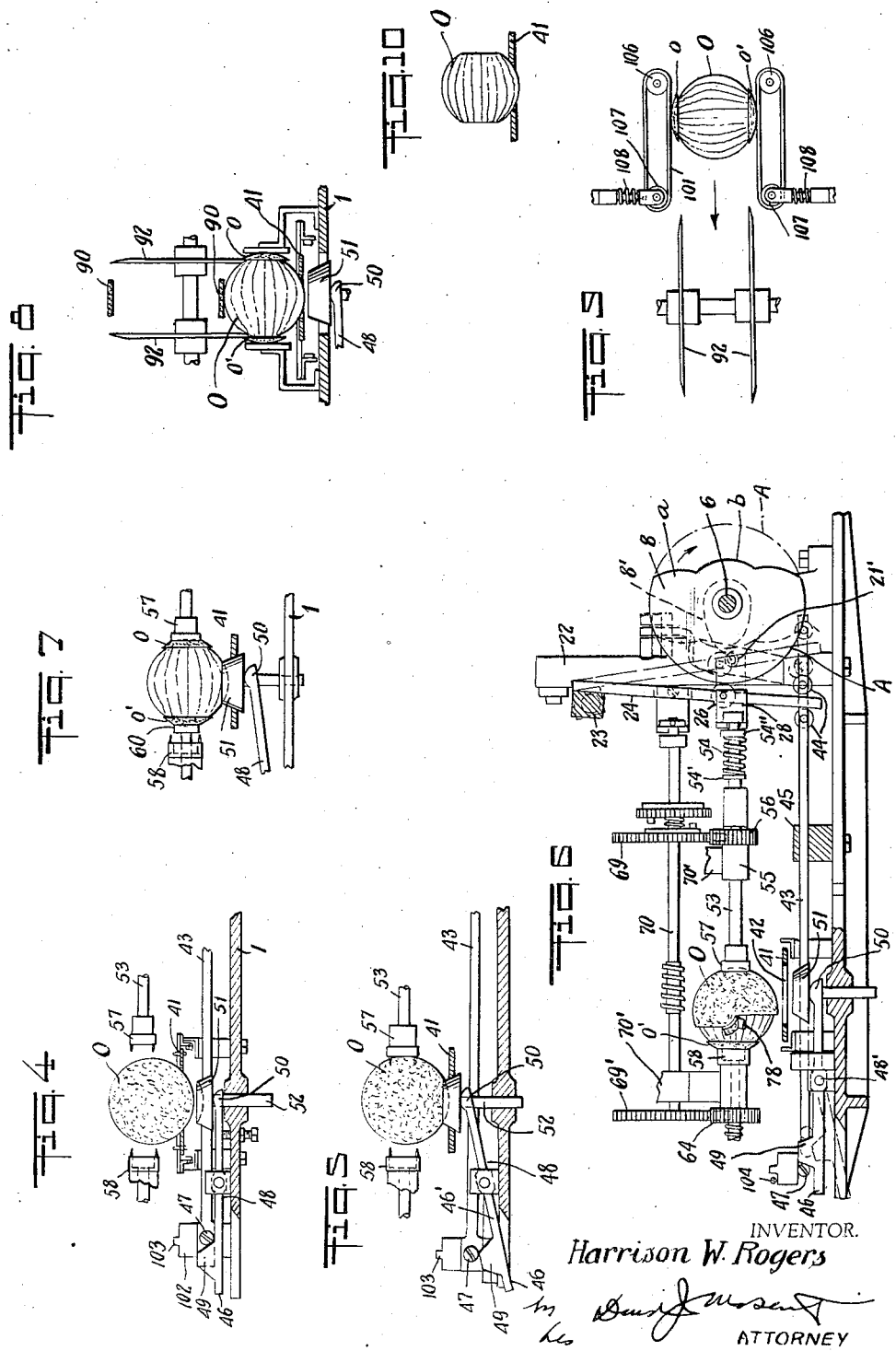

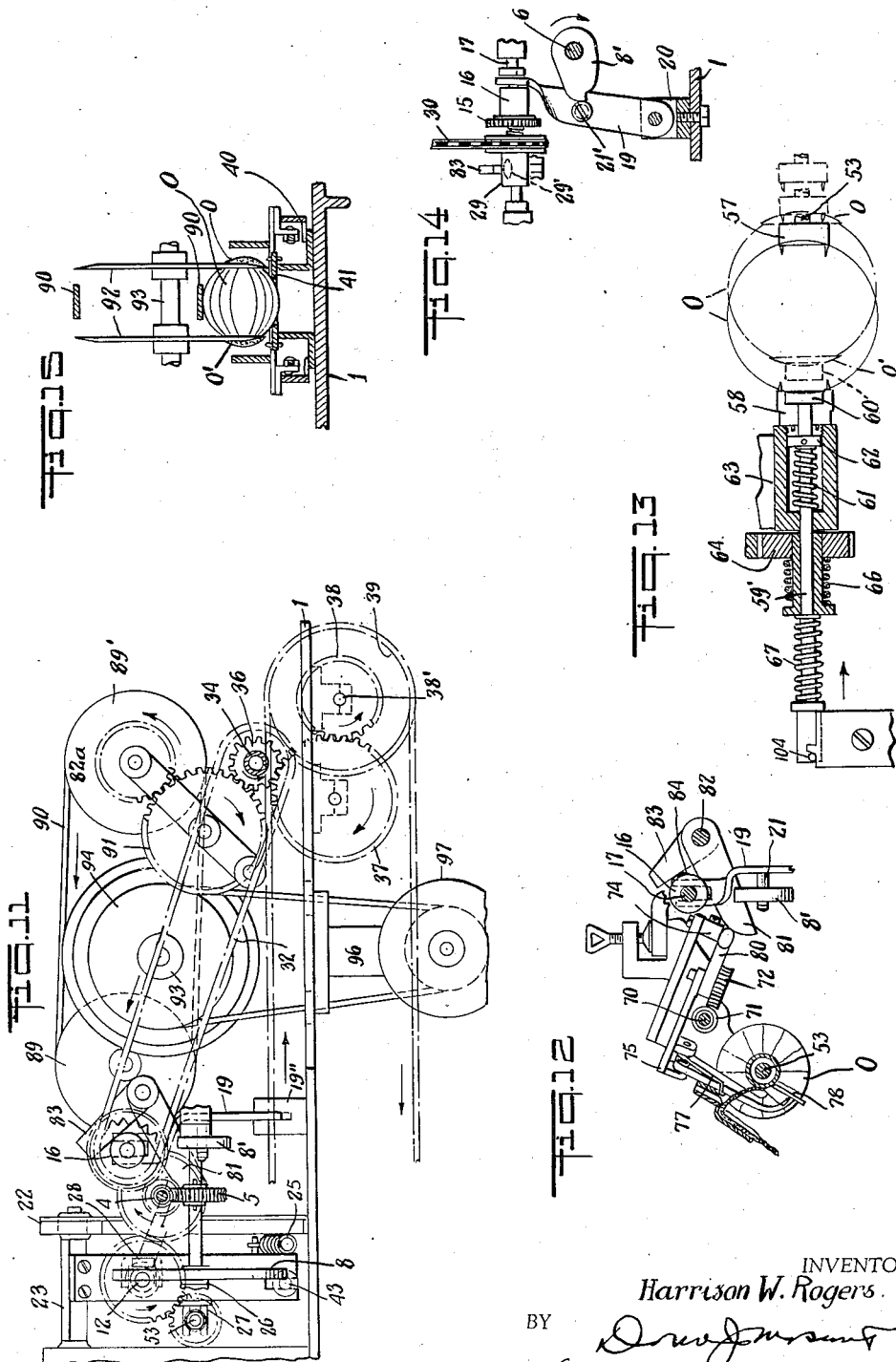

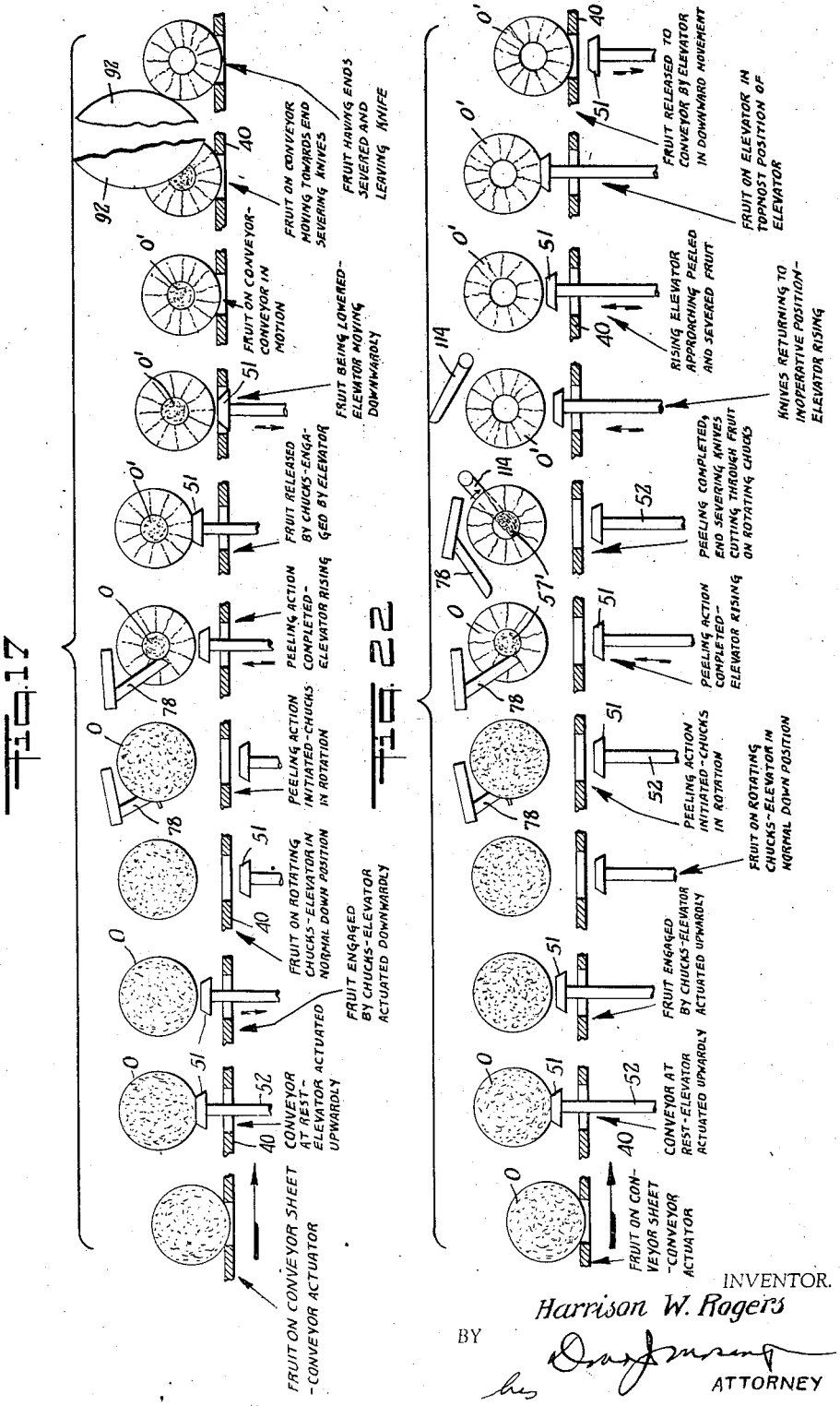

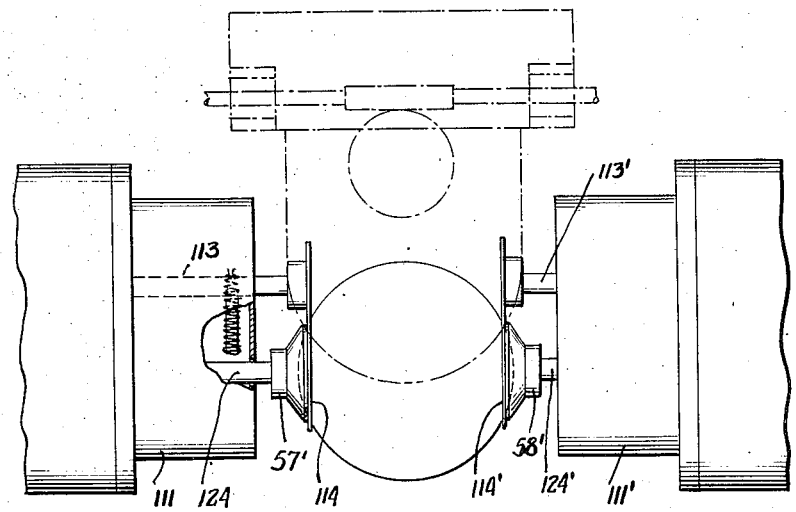
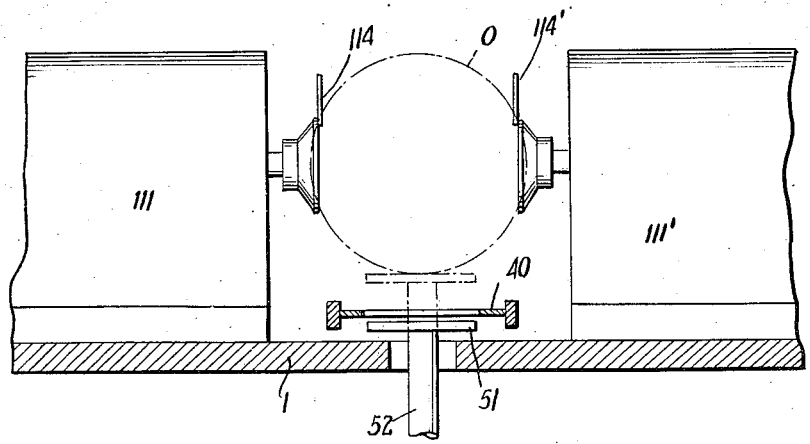

June 16, 1942.　　　H. W. ROGERS　　　2,286,649
FRUIT PEELING MACHINE
Filed Oct. 24, 1941　　　7 Sheets-Sheet 7
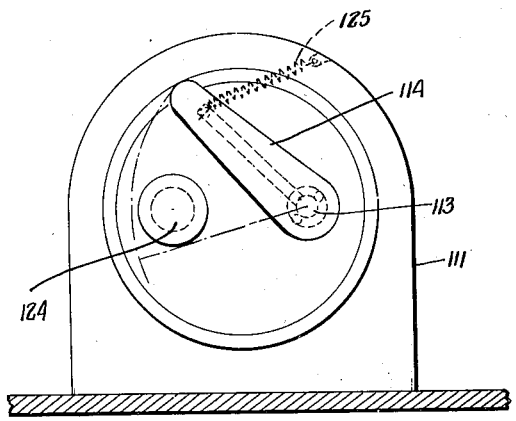
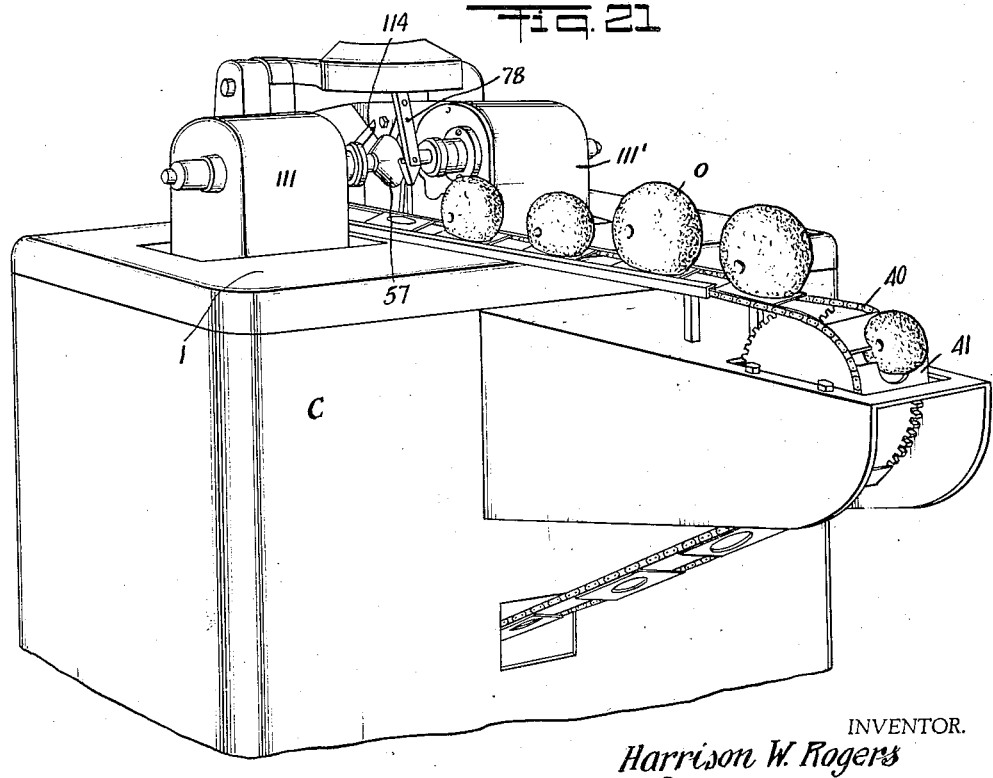
INVENTOR.
Harrison W. Rogers
BY
ATTORNEY Patented June 16, 1942

2,286,649

UNITED STATES PATENT OFFICE 2,286,649

FRUIT PEELING MACHINE

Harrison W. Rogers, Miami, Fla.

Application October 24, 1941, Serial No. 416,356

10 Claims. (Cl. 146—43)

This invention relates generally to fruit processing apparatus and is more particularly directed to a mechanism for peeling or paring fruit and completely removing the rind, such as that shown and described in my co-pending application for Letters Patent, Serial No. 318,785, filed February 14, 1940, of which this application is a continuation-in-part.

As is well known, various mechanisms are available for paring vegetables and fruits, some of which are automatic, while others fall within the category of semi-automatic mechanisms, in which the fruit or vegetable is located for peeling in a hand operation. This, of course, is objectionable from an economic standpoint, aside from those disadvantages which may flow from the mode of functioning of the mechanism, especially in the timing of the several steps. In those automatic mechanisms which are designed for peeling fruits, especially those of the citrus family, as oranges for instance, it has been found that in the passage of a fruit through a machine, for the performance of the several operations incidental to the complete processing for which the machine is designed, that the fruit is frequently crushed to an extent which causes the loss of considerable juice, that it is obviously desirable to retain. Also, when the peeling operation is preliminary to the use of the fruit in its whole state, or of cutting it in large sections, crushing of the fruit and the large amount of juice and pulp that is lost in the functioning of the machine is objectionable.

Therefore, the object of the present invention is to provide an automatically functioning mechanism for peeling fruit, especially that of the citrus variety, whereby the disadvantages of existing mechanisms will be eliminated in an entirely practical manner.

It is also an object of this invention to provide a mechanism as aforesaid, in which the fruit is automatically carried through successive steps of a process, whereby the rind is removed completely without subjecting the fruit to any crushing pulp removing operation, that will result in a loss of juice or cause waste, means being incorporated in my mechanism to resiliently hold the fruit during the peeling operation and to effect the removal of such sections of rind as may remain thereon, following the peeling operation, in a manner which will insure the delivery of the whole fruit from the apparatus with an unbroken contour.

My invention also contemplates the provision of means in combination with a conveyor for delivering the fruit to the peeling mechanism in a step-by-step movement whereby the fruit may be elevated for the rind-removing operation and returned to the conveyor at the conclusion of such operation, and novel mechanism, including cam-actuated devices for effecting the several operations in timed relation.

Other objects and advantages will become evident as the description of the embodiments of my invention shown in the accompanying drawings proceeds, it being understood that variations in the structure shown may be made to meet different requirements of production and use of my invention, without departing from the spirit and scope thereof.

In the drawings:

Figure 1 is a top plan view of my apparatus.

Figure 2 is an elevational view of the left side of the apparatus, as shown in Figure 1.

Figure 3 is a long section on the line 3—3 of Figure 1.

Figure 4 is a cross section through the machine adjacent the fruit rotating chucks, showing the position of the fruit receiving and rotating chucks, the belt conveyor, the elevator and the fruit just prior to its elevation to the chucks.

Figure 5 is a view similar to Figure 4 with the fruit elevated to a position where its polar axis is aligned with the two chucks, one of which is engaged therewith.

Figure 6 is a more extended cross section at the same point of the machine, showing the main control cam, with the fruit gripped between the rotating chucks and engaged by the peeling knife, the elevator having receded to the position shown in Figure 4, with its operating lug transposed on the elevator actuator.

Figure 7 is a detail of the same cross section showing the fruit with its body rind peeled, and the elevator again raised to receive the fruit.

Figure 8 is a cross section similar to Figure 4, showing the peeled fruit returned to the conveyor, with the elevator in its normally inactive position below the belt conveyor, the parts being in the position they assume just prior to the movement of the fruit to the polar end removing knives, shown in the background.

Figure 9 is a top plan view in fragmentary detail of the polar end removing knives and a modified form of guiding means, for insuring the delivery of the peeled fruit to the knives in position for the removal of the polar ends of the fruit.

Figure 10 shows a completely peeled fruit upon the conveyor, just after having passed between the polar end removing knives.

Figure 11 is a section on line 11—11 of Figure 1 reversed to illustrate more clearly the mechanism for removing the polar ends of the fruit.

Figure 12 is a sectional detail of the body rind peeling mechanism assembly shown in Figure 3, and the adjacent means for releasing the swinging peeling knife-carrying arm for its return to initial position, after the peeling operation.

Figure 13 is a detail sectional view of the fruit holding and rotating chucks, to illustrate the components of the left hand chuck, as viewed in Figure 6.

Figure 14 is a detail of the conveyor belt drive cam and associated parts.

Figure 15 is a cross sectional view at a point slightly behind the polar end removing knives, just prior to the fruit being presented to such knives to have the polar ends removed.

Figure 16 is a fragmentary top plan view of the peeled fruit-receiving hopper, showing the means to permit the removed polar ends to be separated from the fruit.

Figure 17 is a diagrammatic view illustrating the sequence of the steps in a complete cycle of operation of the structure of the preceding figures.

Figure 18 is a top plan view of a modified embodiment of my invention, in which the polar end removing knives are mounted for oscillation, in association with the fruit rotating chucks, the peeling mechanism being indicated in dotted lines.

Figure 19 is an elevational view partly in section of the structure shown in the preceding figure, showing the relationship of the conveyor and elevator thereto.

Figure 20 is an end elevation of one of the chuck mechanism housings, that at the left in Figures 18 and 19, showing the position of the polar end removing knife relative to the fruit engaging chuck.

Figure 21 is a view in perspective of an apparatus embodying the chuck and knife mechanisms of Figures 18 to 20; and Figure 22 is a diagrammatic view, illustrative of the sequence of the steps of the form of mechanism shown in Figures 17 to 20.

Referring now to the drawings in detail, in which like characters of reference designate similar parts in the several views, and more particularly to the structure shown in Figures 1 to 8 and 10 to 17, the apparatus includes the bed-plate 1 to which an electric motor 2 may be bolted, this motor, which functions as the prime mover in the operation of the apparatus being connectable by the leads 2', to a suitable source of supply of electrical energy and serving as a direct drive for the main shaft 3, the remote end of which is journaled in the bearing 9.

Rotatable in suitable bearings 7 and 7', below the shaft 3, and transversely thereof, is a second shaft 6, which may be termed the cam shaft, since it carries a so-called camming disc 8 and an auxiliary cam 8', the former embodying a major cam surface A and minor cam surfaces a, a' and b, these cams 8 and 8' rotating continuously, with the shaft 6, which is driven from the shaft 3, through the medium of the worm gear 4 keyed to the latter, meshing with the gear 5, fixed to the shaft 6.

Disposed parallel to the main shaft 3 in bearings 18 and 18' is a shaft 17 on which is slidably mounted a gear 15, the grooved hub 16 thereof being engaged by the bifurcated end of the forked lever 19 pivotally supported from the bedplate, as at 19" and provided with a roller 21' disposed in the path of movement of the auxiliary cam 8' for engagement thereby, the gear 15 which is adapted to mesh with the pinion 14 on the drive shaft 3 having a dog 15' engageable with a complemental dog 31' on the idler 29 on said shaft 17, the idler carrying a sprocket 30. The gear 15 is adapted to be urged into clutching engagement with said idler 29, in opposition to the spring 31 therebetween, in response to the cam-actuation of the forked lever 19 for driving the conveyor, as hereinafter described.

Mounted on the bearings 22, 22' is a rockable shaft 23, parallel to the shaft 6, carrying a dependant arm 24, to which are pivotally connected bearing-fittings 27 and 28 in vertically spaced relation, for the reception of the head ends of the shaft 12 and the chuck shaft 53, respectively, for relative semi-universal movement, the shaft 12 having a gear 11 keyed thereto which is provided with a dog 11' adapted to engage with the dog 68 of the gear 69, keyed to the shaft 70, in opposition to the spring 13, when the shafts 12 and 53 are shifted axially, in response to the cam-actuation of said arm in the functioning of the fruit engaging means, and the performance of the sequential paring operation, as hereinafter explained. The chuck shaft 53 is slidable longitudinally of its bearings, 55, 55', while the end of the shaft 12 beyond the gear 11 may be telescoped within the end of the aligned shaft 70, or otherwise suitably supported to provide for the requisite sliding movement thereof, the gear 11 being in mesh with a gear 10 keyed to the drive shaft 3.

A link belt or chain 32 traverses the sprocket 30 on the idler 29 and a similar sprocket 33 fast to the shaft 34, journaled at 35 and 35', this shaft having a gear 36 keyed thereto, which through a gear train, including the gears 37 and 38 drives the shaft 38' to which the gear 38 is fixed, this latter shaft also carrying the laterally spaced sprockets 39 aligned with a similar pair of sprockets 39' at the fruit reception end of the apparatus, freely rotatable upon the shaft 39". A conveyor, including the laterally spaced link-chains 40, traversing the sprockets 39 and 39' in engagement therewith, and plates or platforms 41 supported therebetween, is provided for receiving and delivering the fruit in a step-by-step or intermittent movement to the positions in which the successive rind-removing and subsequent operations are performed, each of said plates having an annular aperture 42 forming a receptacle for retaining the fruit in position thereon and for admitting of the engagement of the fruit by a so-called elevator 51, to locate it in position for polar engagement by the cooperating chucks 57 and 58 for the performance of the peeling or rind-removing step, in the functioning of the apparatus, as will become apparent.

From the foregoing, it will be manifest that the continuously rotating cam 8', will alternately become effective and ineffective with respect to the roller 21' of the forked lever 19, to produce an intermittent or step-by-step movement of the conveyor. When the cam engages said roller, the lever 19 is actuated in opposition to its spring 19' to urge the slidable gear 15—16 toward the idler-sprocket 29—30 and into clutching engagement therewith, rotative effort being then transmitted from the drive shaft 3 to the shaft 34, through the chain 32 engaged with the sprocket 33. As the peak or nose of the cam leaves the roller 21', the return of the forked-lever 19 under the influence of said spring 19' to its normal position, obviously will actuate the gear 15 axially of the shaft 17 to disconnect it from the idler-sprocket 29—30 (see Figure 1), the clutch spring 31 contributing to the declutching operation, whereupon the movement of the conveyor is arrested. In other words, in each complete revolution of the cam 8' the conveyor is advanced one step, from the fruit-receiving end towards the fruit-discharging end, to locate a fruit in position for a peeling operation, during the performance of which the conveyor remains at rest.

As previously pointed out, the cam shaft 6 is continuously driven from the shaft 3, and during the actuation of the conveyor and while it is at rest, the cam 8 continues its rotative movement, to render operative its effective camming surfaces in synchronizing the raising of the aforesaid elevator 51, the engagement of the fruit at its polar ends by the chucks 57 and 58, the peeling step and the redisposition of the fruit upon the conveyor in sequence, all of these operations being timed to take place while the conveyor remains at rest, during which period, of course, the cam 8' revolves out of engagement with the roller 28' of the forked lever 19.

The aforementioned dependent arm 24, which carries a roller or cam follower 26 and is slotted at its lower end, as at 24', under the influence of the spring 25 is normally urged toward the cam to maintain said roller in continuous riding contact with the periphery thereof composed of a major concentric portion A and the minor arcuate surfaces a, a' and b, the surfaces a and a' being of the same order. As the cam 8' functions to connect the conveyor to the drive shaft 3 for actuation, the cam 8 is in the position shown in dotted lines in Figure 6, with the roller 26 of the lever 24 traversing the cam surface b, the lever 24 being then in its normal inactive position (likewise shown in dotted lines in Figure 6). As the cam continues its revolution, the roller 26 next enters into engagement with the cam surface a, which initiates a radial movement of the arm 24 in the direction of the conveyor, whereby the raising of said elevator 51 having a stem 52 reciprocable in the bearing 53' of the bed-plate 1, is accomplished, the position of the elevator relative to the halted conveyor and the fruit O, superposed thereon, at the instant of the initiation of the movement of the arm 24 as just described, being clearly shown in Figure 4.

The elevator actuating mechanism, includes a rod 43 reciprocable transversely of the conveyor in the bearing 45, which is provided with a pair of tandem rollers 44, at one end, relatively spaced for the entry of the slotted end 24' of the arm 24 therebetween, and a laterally projecting pin 47 at its other end. This pin 47 is adapted to traverse the truncated lug 49 integral with a lever 48 which is fulcrumed at 48' and embodies a forked-end 50 loosely engaged with the base of said elevator 51. Thus, when the arm 24, still in engagement with the cam surface a, moves toward the conveyor, a concurrent movement of the slide rod 43 causes its pin 47 to ride the lug 49 and tilt the lever 48 to raise the elevator engaged by the forked end thereof, under the guidance of its stem 52, as aforesaid, the elevator, at the peak of its movement, protruding through the registering opening 42 in the conveyor plate 41, at rest immediately above it, to engage and lift the fruit therefrom, for gripping by the chucks 57 and 58 (see Figure 5).

As the arm 24 continues to advance, in engagement with the cam surface a, the shaft 53 carrying the aforesaid chuck 57 is moved axially in opposition to the spring 54, located between the semi-universal mounting 28 and the contiguous shaft bearing 55, to initially cause the prongs of said chuck to penetrate the adjacent polar fruit and shift the impaled fruit bodily from its centered position over the conveyor receptacle, into similar association with the opposite chuck 58, which is impelled into yieldable engagement with the fruit by the expansion of the spring 67 against the flanged sleeve 65 splined to the shaft 59' journaled in the bearing 63 and carrying a drive gear 64.

Coincidental with the axial movement of the shaft 53 and the resulting engagement of the fruit O by the chucks 57 and 58, the elevator 51, which remains in its raised position, during the interval in which the pin 47 dwells upon the head of the lug 49, is lowered to its normal position beneath the stationary conveyor, as the said pin rides to a position abutting upon the outer free end 46 of the elevator-operating lever 48, in response to the continued actuation of the rod 43 by the movement of the arm 24 (see Figure 6).

As will be understood from the foregoing, the fruit O has now been gripped between the chucks 57 and 58, following its elevation from the stationary conveyor, these steps of the operation being synchronized by the formation of the cam surface a and the responding varying arcuate movement of the dependent arm 24, as its roller 26 rides such surface.

As said roller enters upon the major cam surface A, a further increase in the arc of this continuing movement of the arm 24 results, to shift the shaft 12 toward the shaft 70 and cause the dogs 11' and 68 of the gears 11 and 69 to engage, transmitting the torque of said shaft to the aligned shaft 70, and through the gears 69 and 69' to the shaft 53 of the chucks 57 and the gear 64 which drives the chuck 58, as heretofore described, for rotating the engaged fruit for the performance of the peeling operation, as hereinafter set forth.

A carriage suitably mounted for tilting movement above the conveyor supports an arm 73 pivotally mounted, as at 74, the arm embodying a segmental gear or rack 72 adapted to mesh with the worm 71 of the shaft 70, a bracket 75 extending forwardly of said arm providing a pivotal mounting for a knife holder 76, in the free end of which a knife 78 is removably held, a spring 77 carried by the bracket acting upon the knife arm to urge the knife into functioning relation with the rind of the fruit gripped between the chucks 57 and 58. A spring embracing a relatively fixed point and engaged with said arm 73 is provided for returning the latter to its initial position, to the right of the conveyor, at the conclusion of a fruit paring operation, as hereinafter described, within the safety guard plate 100.

Suitably mounted, adjacent and parallel to the aforesaid shaft 17, is a rock shaft 82 having arms 81 and 82' at its respective ends, the arm 82' being connnected by a spring 82" to the frame of the apparatus, while the arm 81 engages beneath the arm 80 projecting laterally from the aforesaid knife mechanism carriage. An actuating lever 83 for said shaft 82 is adapted to be urged upwardly as it rides upon the cam lug or projection 29' on the idler 29 to rock said shaft anti-clockwise, the concurrent upward movement of the arm 81 engaged with the carriage arm 80 tilting or depressing the carriage to locate the peeling knife in functioning position, when the gear 15 is disengaged from the idler 29 in response to its actuation of the forked-lever 19 by the cam 81 as aforesaid, the lever 83 bearing upon the lug 29' during the cycle of the shaft 17 in which the conveyor is inactive, to maintain the carriage in tilted position until the peeling operation is completed.

As the dogs of the gears 11 and 69 engage to initiate rotation of the chuck supported fruit, the arm 73 moves in an arcuate path transversely of the conveyor as the segmental gear 72 is actuated in mesh with the worm 71, the shieldably-supported knife 78, under the influence of the spring 77, traversing the chuck-rotated fruit, in rind-removing contact therewith. During this peeling operation, the roller 26 of the arm 24 continues following the surface A of the cam 8.

As the roller 6 leaves the cam surface A to enter upon the surface a', the knife carriage has traversed the conveyor in the completion of the peeling operation and the reversal of the arcuate movement of the arm 24 is initiated, under the influence of its spring 25 and the control of the cam surface a' upon which the roller 26 tracks, with a resulting disengagement of the dogs of the gears 11 and 69.

As the revolution of the shaft 70 ceases, the fruit still impaled on the now inactive chucks 57 and 58 is bodily shifted to the right to center it for redisposition upon the elevator 51 as hereinafter explained, which is lifted through the conveyor plate orifice as the rod 43 is reciprocated to the right to cause its pin 47 to ride the truncated lug 49 and raise the forked end of the lever 46 loosely engaging the elevator as previously pointed out. As the said rod 43 is reciprocated in the raising of the elevator the fruit is pressed out of engagement with the prongs of the chuck 58, by the axial movement of the shaft 59'; whereby the head 60 thereof, normally housed within said chuck, is expelled to frictionally engage the adjacent polar end of the fruit. This is accomplished by the movement of the shaft in response to the expansion of the spring 61 contained within the bearing 63 and the accelerating action of the spring 105 connected to the frame of the apparatus and the transverse pin 104 on said shaft as said pin is released by a projection 103 on a block 102 fast to the slidable rod 43, said spring 61 otherwise being held in compression between the collar 62 and the end of said bearing, to maintain said head retracted within the chuck, by the engagement of said projection 103 with the shaft pin 104.

The axial movement of the shaft 59' continues with the corresponding directional movement of the shaft 53 until the fruit is centered over the conveyor plate through which the elevator is raising to engage the fruit (see Figure 7), whereupon the continued recession of the shaft 53 effects the disassociation of the chuck 57 from the fruit, and the head 60 of the shaft 59' is again retracted into the chuck 58, at the instant the elevator assumes its fruit-supporting position, the peeled fruit resting upon the elevator with its polar axis disposed transversely of the conveyor.

The continued axial movement of the slide rod 43 obviously will effect the lowering of the fruit-carrying elevator, as the pin 47 traverses the lug 49 to come to rest in contact with the position 46' of the elevator actuating lever 46, to deposit the fruit on the conveyor plate 41, as in Figure 4.

As the arm roller 26 leaves the cam surface a' the cam 8' becomes effective upon the pin 21' of the forked lever 19 to move the gear 15 axially of its shaft 17 for clutching engagement with the sprocket idler 29—30 to advance the conveyor one step to bring the spring 42 in the next fruit supporting plate 41 into registration with the elevator, as heretofore described, for the performance of another peeling operation. As the idler 29 revolves in clutching engagement with the gear 15, the lever 83 rides off the lug 29' and tracks upon the periphery of said idler. The resulting clockwise rocking of the shaft 82 and concurrent downward movement of the arm 81 induce a like directional movement of the carriage arm 80 and the disengagement of the segmental gear 72 from the worm 71, as the carriage is tilted upwardly, whereupon the aforesaid spring 79 functions to swing the arm 73 back to its initial knife-operation position, to the left of the conveyor. As the conveyor comes to rest, by the disengagement of the gear 15 and idler 29, the lug 29' on the latter again becomes effective to rock the shaft 82 to condition the peeling knife for functioning, as heretofore explained.

As will be observed, following the peeling operation, a small section of rind remains at each polar end of the fruit, indicated at o—o'. These sections are removed in a further operation, involving the functioning of a pair of disc or circular knives 92 rigid with a shaft 93. A motor 97 carried by a hanger 96 drives said shaft through the medium of a belt 95 traveling upon the pulley 94 keyed to the shaft which has bearings at 93', the knives being relatively laterally spaced for the passage of the fruit therebetween, in the removal of the end sections of rind.

The polar or end-removing operation is performed while the conveyor is at rest, a belt 90 in superposed relation to the conveyor, the lower train of which is adapted to cooperate with the receptacle-forming aperture 42 of the conveyor plates, holding the fruit immobile against the centrifugal action of the knives 92, rotating in cutting engagement therewith. This belt traverses an idler pulley 89 and a driving pulley 89', suitably mounted, the latter pulley being part of a gear 82a meshing with a gear 91 driven from the aforesaid conveyor actuating gear 36, a spring actuated arm 87 carrying an idler roller 88 bearing upon the lower train of the belt, in the manner of a belt tightener, to maintain the requisite tension in the belt, so that the fruit is firmly held in position upon the plates, without undue distorting pressure, insuring a minimum of waste of the pulp in the functioning of the knives 92.

To the rear of the paring knife carriage, approximately in the plane of the fruit, flexible converging arms 85 are fixed to the frame of the apparatus to guide the fruit in its transit to the end severing position. As a fruit is subjected to the paring operation, the actuation of the conveyor upon the completion of each operation brings it to rest intermediate the paring position and that in which the removal of the ends is effected, the next succeeding movement of the conveyor locating the fruit in position for the functioning of the leading edges of the knives 92, as the belt 90 cooperates with the conveyor plate in holding the fruit against displacement during the cutting operation. Coincidental with the next movement of the conveyor the fruit is advanced through the continuously rotating knives 92 whereby the severing of the end section of rind initiated in the engagement of the fruit by the leading edges of the knives is completed, the fruit again coming to rest, as the conveyor halts, partly beyond the effective path of the knives, and advancing in a fixed step to the chute 98 at the end of the conveyor into which it gravitates for further processing or other purpose, the severed rind sections o—o' dropping through a discharge outlet 99 for disposal (Figure 16).

In Figure 9 a modification of the flexible guide arms 85 is shown, a pair of endless belts 101, traveling upon the pulleys 106 and 107, the latter of which are resiliently urged towards the fruit by the spring 108, being employed to guide the fruit in its transit from the paring zone to the end severing knives of the apparatus.

In Figures 18 to 22 inclusive, a modification of the construction just described is shown, in which an oscillating knife is associated with each of the chuck mechanisms for severing the polar end sections o—o' of the fruit, these knives becoming operative while the fruit is rotated in engagement with the opposed chucks, following the performance of the rind-removing or peeling operation.

As will be noted, the chuck mechanisms are housed in casings 111—111' on either side of the conveyor, generally indicated at C, the chucks 57' and 58' being actuated into engagement with the fruit O, when raised to the plane of the chucks, by the elevator, for the performance of the peeling operation by the knife 78, as previously described.

However, in this modified construction, the chuck mechanisms are independently driven, as by the motor 97, which is available in the general apparatus of Figures 1 to 17, by virtue of the discarding of the circular knives 92, and the replacement thereof by the oscillating knives 114 and 114', these knives being mounted respectively in the shafts 113 and 113', parallel to and in in the plane of the chuck shafts 124—124' for oscillating movement toward and through the fruit end and back to their normally inoperative position, as shown in Figure 20.

The chuck shafts 124—124' may be driven from said motor 97, by any suitable arrangement of gears, in a train, or otherwise, the motor being energized for functioning to initiate rotative movement of the chucks and the impaled fruit O, in properly timed relation to the engagement of the fruit by the chucks and the functioning of the peeling knife 78, by a relay in circuit with a switch mechanism actuatable in response to the movement of the arm 24 in engagement with the cam 8, as heretofore described, the period of rotation of the chucks of the present showing being slightly prolonged, as compared to that of the first described embodiment, to provide for the functioning of the knives 114 and 114' while the fruit is still in rotative motion.

The oscillating knives 114—114' are similarly driven for functioning in their end severing movement by motor 97 or, if desired, a separate motor and suitable connecting gearing, the same becoming operative for this function by the actuation of a circuit closer upon the completion of the peeling operation to rock the knife shafts 113—113'. This rotative movement of the shaft causes the knives to move downwardly in an arcuate path to engage the fruit and pass therethrough to sever the polar ends, the fruit remaining in engagement with the chucks since, under the influence of the springs 67 effective on the chuck shafts, as heretofore described, the fruit is under slight compression and its inherent resilience permits it to expand into engagement with the chucks as the knives are interposed between it and the latter in the cutting movement. A similar condition prevails to facilitate the upward arcuate or return movement of the knives 114—114' between the fruit and the chucks, upon the completion of the polar-end severing operation, the knives moving upwardly to their normally inactive position, in response to the contraction of the springs 125 connected thereto and to a fixed point thereabove as the mechanism functions as shown in Figure 20. These springs become effective immediately upon the completion of the downward end-severing movement of the knives, at which time the aforesaid circuit breaker is actuated in response to the movement of the arm 24 to de-energize the knife-driving motor, as the motor 97 is cut out and the elevator rises to receive the fruit and deliver it to the conveyor, as already explained, for advancement to the discharge end of the latter as the conveyor is actuated by the engagement of the gear 15 with the sprocket idler 29—30, in response to the shifting of the forked lever 19, as engaged by the cam 8'.

From the foregoing description of my invention, it will be manifest that the fruit placed upon the conveyor is delivered to the chuck zone in a step-by-step conveyor movement, elevated to poise its polar axis in alignment with the chucks by which it is engaged and then revolved with the chucks for the peeling operation, the knife in this operation passing over the fruit and conforming to the contour so as to remove the rind in a spiral except for small sections thereof at the polar ends of the fruit which lie within the area engaged by the chucks, these polar end sections being removed in a successive step by knives rotating towards the fruit in their cutting operation.

For simplicity in the understanding of the sequence of steps in a complete cycle of operation of the structures respectively of the one embodiment disclosed in Figures 1 to 16 and the other embodiment disclosed in Figures 18 to 21, Figures 17 and 22 graphically represent the respective elements of the apparatus in their sequential movement as the fruit is acted upon in its continuous path of movement, each of the specific steps of such figures having their-below explanatory indicia outlining such step-by-step operations.

While the invention has been described more or less specifically, as herein shown, certain changes in the structural details of the apparatus may be effected within the purview of the appended claims.

I claim:

1. A fruit peeling machine, including a peeling means, a pair of spaced fruit-supporting chucks positioned adjacent the peeling means, means for rotating the chucks about a horizontal axis and for moving the chucks axially into and out of fruit-engaging position, an intermittently movable conveyor having a path of travel which has a portion below the space between the chucks, a reciprocable fruit elevator mounted to raise a fruit from the conveyor into the space between the chucks and means to operate the chucks, conveyor and elevator in timed relation.

2. A fruit peeling machine, including a peeling means, a pair of spaced fruit-supporting chucks positioned adjacent the peeling means, means for rotating the chucks about a horizontal axis, an intermittently movable conveyor having a path of travel whch has a portion below the space between the chucks, a reciprocable fruit elevator mounted to raise a fruit from the conveyor into the space between the chucks and means to operate the chucks, conveyor and elevator in timed relation.

3. A fruit peeling machine, as claimed in claim 2, wherein a pair of polar-end-removing knives are operated in timed relation to the chucks, conveyor and elevator.

4. A fruit peeling machine, including a conveyor embodying fruit-supporting seats, a pair of spaced fruit engaging and supporting chucks, revoluble about a horizontal axis, located above the path of travel of said conveyor, means for actuating said conveyor in a step-by-step movement, means for elevating a fruit from its conveyor seat to a plane for engagement by said chucks, peeling means associated with said chucks and mechanism for sequentially elevating said fruit, engaging the chucks therewith, rotating said chucks and functioning said peeling means, while said conveyor is at rest.

5. A fruit peeling apparatus, including a conveyor embodying fruit-supporting seats, a pair of spaced fruit-engaging and rotating chucks revoluble about a horizontal axis, peeling means mounted adjacent said chucks, means for actuating said conveyor in a step-by-step movement, in a path below said chucks, reciprocable means mounted below said conveyor and actuatable through a seat supporting a fruit to lift such fruit from its seat to align its polar axis with the axes of said chucks, and mechanism functioning in timed relation to sequentially actuate said reciprocable means to lift the fruit, engage the chucks therewith, rotate the chuck supported fruit and function said peeling means, said reciprocable means returning to a position below said conveyor when the fruit is chuck-supported.

6. A fruit peeling apparatus, including a peeling means, a pair of spaced fruit-supporting chucks positioned adjacent said peeling means, means for rotating the chucks about a horizontal axis and for moving the chucks axially into and out of fruit-engaging positions, an intermittently movable conveyor having a path of travel below the spaced chucks, a reciprocable fruit elevator mounted to raise a fruit from the conveyor into the space between the chucks, mechanism for operating the conveyor, elevator, chucks and peeling means in timed relation and mechanism, including a pair of rotatively mounted knives, operable on the conclusion of a peeling operation to actuate said knives to sever the polar ends of a fruit.

7. A fruit peeling apparatus, including a peeling means, a pair of spaced fruit engaging and rotating chucks positioned adjacent said peeling means, said chucks being revoluble on a horizontal axis, a conveyor embodying apertured supporting surfaces for the fruit, mounted for intermittent movement in a path below said chucks, means adapted to rise through a registering aperture of a fruit-supporting surface of the conveyor, to lift a fruit superposed thereon to a position with its polar axis in alignment with the axes of said chucks, for engagement by said chucks, when said conveyor is at rest, and means for rotating said chucks and functioning said peeling means.

8. A fruit peeling apparatus, including a peeling means, a pair of spaced fruit-engaging chucks revoluble on a horizontal axis, positioned adjacent the peeling means, a conveyor mounted for intermittent movement in a path below said chucks, said conveyor embodying fruit-supporting surfaces with which the fruit is loosely engageable, means effective for transferring a fruit from a conveyor surface to a plane thereabove for engagement by said chucks, means for revolving said chucks and means for functioning said peeling means to traverse the fruit rotating with said chucks, the transfer of the fruit to the chucks and the subsequent operations occurring in timed relation, while the conveyor is inactive.

9. A fruit peeling machine, including a peeling device, a pair of spaced fruit-engaging chucks, mounted adjacent said peeling means for revoluble movement on a horizontal axis, an intermittently movable conveyor having a path of travel below said chucks, means for elevating a fruit from said conveyor for engagement between said chucks, means for rotating said chucks with the fruit engaged therebetween, means for functioning said peeling device and mechanism for actuating said elevating means, said chucks and said peeling device in timed relation, said mechanism including a single cam embodying a plurality of effective camming surfaces and a member rockably responsive to the cam movement.

10. A fruit peeling machine, including a peeling device, a pair of spaced fruit-engaging chucks, mounted adjacent said peeling means for revoluble movement on a horizontal axis, an intermittently movable conveyor having a path of travel below said chucks, means for elevating a fruit from said conveyor for engagement between said chucks, means for rotating said chucks with the fruit engaged therebetween, means for functioning said peeling device, mechanism for driving said conveyor, including a clutch and a cam for conditioning said clutch for transmitting torque, and mechanism for actuating said elevating means, said chucks and said peeling device in timed relation, said latter mechanism including a single cam and a member rockably responsive to the cam movement when said first described cam is ineffective relatively to said clutch.

HARRISON W. ROGERS.